Figure 1:
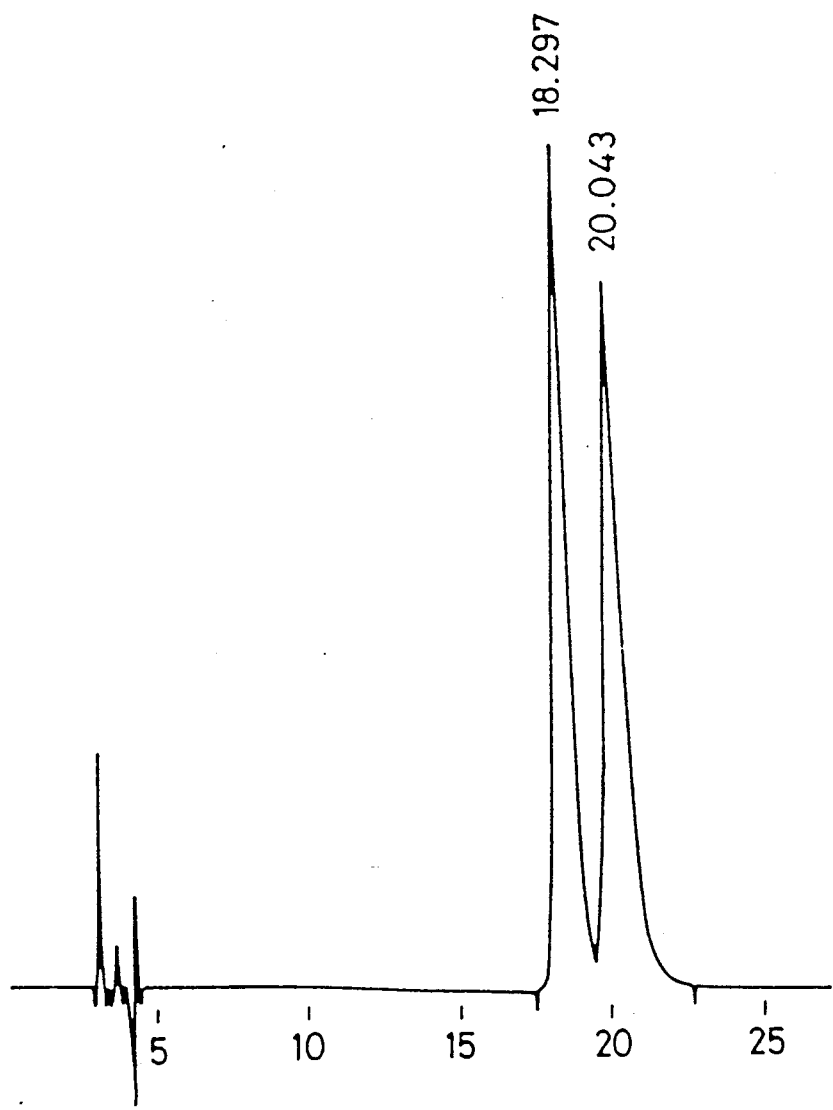

United States Patent [19]

Miyano et al.

[11] Patent Number: 5,051,176
[45] Date of Patent: Sep. 24, 1991

[54] PACKING MATERIAL FOR LIQUID CHROMATOGRAPHY

[75] Inventors: Sotaro Miyano; Shuichi Oi; Masayuki Shijo, all of Sendai, Japan

[73] Assignee: Tasoh Corporation, Japan

[21] Appl. No.: 587,942

[22] Filed: Sep. 25, 1990

[30] Foreign Application Priority Data

Sep. 25, 1989 [JP] Japan .................................. 1-246444

[51] Int. Cl.$^5$ ............................................ B01D 15/08
[52] U.S. Cl. .............................. 210/198.2; 210/502.1; 210/635; 210/656; 502/401
[58] Field of Search ...................... 210/635, 656, 198.2, 210/502.1; 502/401, 402

[56] References Cited

U.S. PATENT DOCUMENTS

| | | | |
|---|---|---|---|
| 4,512,898 | 4/1985 | Oi | 210/198.2 |
| 4,714,555 | 12/1987 | Shibata | 210/198.2 |
| 4,782,040 | 11/1988 | Revis | 210/198.2 |
| 4,786,415 | 11/1988 | Shibata | 210/198.2 |
| 4,830,921 | 5/1989 | Kitayama | 210/198.2 |
| 4,846,968 | 7/1989 | Yuki | 210/198.2 |
| 4,879,038 | 11/1989 | Namikoshi | 210/198.2 |
| 4,897,198 | 1/1990 | Shibata | 210/198.2 |
| 4,919,803 | 4/1990 | Doyle | 210/198.2 |
| 4,931,184 | 6/1990 | Okamoto | 210/198.2 |
| 4,963,254 | 10/1990 | Oi | 210/198.2 |

OTHER PUBLICATIONS

Oi, "HPLC Separation of Enantiomers on a Chiral Stationary Phase Containing 1,1'-Bianthracene-2,-2'-Dicarboxylic Acid Bonded to Silica Gel", Chem. Lett. (1), 1990, pp. 59–62.

Okamoto, "Separate Optical Isomers by Chiral HPLC", Chemtech, Mar. 1987, pp. 176–181.

Pirkle, "Useful and Easily Prepared Chiral Stationary Phases for the Direct Chromatographic Separation of Enantiomers of a Variety of Derivatized Amines, Amino Acids, Alcohols, and Related Compounds", J. Org. Chem., vol. 51, 1986, pp. 4991–5000.

Primary Examiner—Ernest G. Therkorn
Attorney, Agent, or Firm—Cushman, Darby & Cushman

[57] ABSTRACT

A packing material for liquid chromatography comprising (S)- or (R)-1,1'-bianthryl-2,2'-dicarboxylic acid as stationary phase.

6 Claims, 1 Drawing Sheet

PACKING MATERIAL FOR LIQUID CHROMATOGRAPHY

The present invention relates to a packing material for liquid chromatography useful for separation of various compounds, particularly for separation of isomers, especially for optical resolution of racemic modifications which used to be hardly separable, and particularly useful for resolution of (dl)-alcohol modifications.

Heretofore, direct resolution of racemic modifications by means of various optically active stationary phases have been known. Such resolution is described in detail by Y. Oamoto, CHEMTECH, 1987, 176; or W.H. Pirkle, T.C. Pochapsky, G.S. Mahler, D.E. Corey, D.S. Reno, and D.M. Alessi, J. Org. Chem., 51, 4991 (1986). Heretofore, stationary phases employing various optically active compounds have been known. For example, (L)-amino acids, optically active amides or optically active carboxylic acids may be mentioned. As specific compounds (L)-valine, (L)-leucine, (L)-isoleucine, (L)-phenylglycine derivatives, (S)-1-(1-naphthyl)ethylamine derivatives, (S)- or (R)-1,1-binaphthyl-2,2'-dicarboxylic acid and chrysanthemumic acid may be mentioned. A stationary phase of such an optically active compound is usually prepared by forming an ionic bond or a covalent bond between an aminoalkyl group grafted on the surface of particles of e.g. silica gel and a carboxyl group of the optically active compound. Otherwise, the stationary phase may be formed by the same bond system as above between the carboxymethyl group grafted on the surface of particles of e.g. silica gel and an optically active amino compound.

Such an optically active stationary phase distinguishes racemic modifications usually by a difference in the retention caused by a delicate difference in the steric environment as between d-isomer and l-isomer when the racemic modifications are retained in the stationary phase by a hydrogen bond between an amino bond and an amide bond, an ester bond or a hydrogen group of the racemic modifications and by the $\pi$-$\pi$ interaction. As the eluent for such separation, it is common to employ a hexane-alcohol system.

Various racemic modifications have been separated by the above described function. However, no convenient stationary phase has heretofore been discovered which is effective for separating dl-alcohol modifications, particularly aliphatic (dl)-alcohol modifications.

The present inventors have conducted an extensive research with an aim to develop a stationary phase which is widely useful for optical resolution of such (dl)-alcohol modifications and as a result, have found it possible to obtain an excellent packing material by using (S)- or (R)-1,1'-bianthryl-2,2'-dicarboxylic acid as stationary phase. The present invention has been accomplished on the basis of this discovery.

Thus, the present invention provides a packing material for liquid chromatography comprising (S)- or (R-1,1'-bianthryl-2,2'-dicarboxylic acid as stationary phase.

Now, the present invention will be described in detail with reference to the preferred embodiments.

In the accompanying drawing, FIG. 1 shows a chromatogram illustrating the resolution of (dl)-2-butyl-3,5-dinitrophenyl-carbamate by means of the packing material of the present invention.

The optically active compound of the invention i.e. (S)- or (R)-1,1'-bianthryl-2,2'-dicarboxylic acid can be prepared by a known method, namely, by subjecting (dl)-1,1'-bianthryl-2,2'-dicarboxylic acid to optical resolution by means of an alkaloid such as quinidine.

Namely, (dl)-1,1'-bianthryl-2,2'-dicarboxylic acid quinidine salt is dissolved in ethanol under heating and refluxing, and the solution is cooled, whereupon precipitated crystals are collected by filtration and suspended in ethanol and then dissolved under heating and refluxing. The solution is cooled, and the precipitates are collected by filtration to obtain (R)-dicarboxylic acid quinidine salt.

The filtrate is distilled under reduced pressure, and crude crystals thereby obtained are treated in the same manner to obtain (S)-dicarboxylic acid quinidine salt.

The respective salts are subjected to hydrochloric acid treatment to obtain optically active (S)- and (R)-1,1'-bianthryl-2,2'-dicarboxylic acids, respectively.

When the optically active compound of the present invention is used as a stationary phase of a packing material, the substrate may be a porous carrier such as silica gel, glass beads or diatomaceous earth, which may be spherical or in the form of pulverized particles. Preferably, the carrier is spherical particles having a particle size of from 0.1 to 1000 µm and a pore size of from 10 to 1000 Å, more preferably a particle size of from 1 to 100 µm and a pore size of from 50 to 500 Å. As a method for fixing the optically active compound to the substrate carrier, there may be mentioned a method of adsorbing it to the substrate carrier, a method of fixing it by an anionic bond and a method of fixing it by a covalent bond such as an amide bond. When the conditions for liquid chromatography are taken into consideration, it is preferred to fix it by an amide bond or the ionic bond. For the formation of the amide bond or the ionic bond, an amino group-containing organosilane treating agent is reacted to the surface of the substrate carrier in a solvent to introduce amino groups to the surface of the substrate carrier. The amount of the amino groups introduced is preferably up to 2.0 meq/g dry carrier. To the amino group-containing carrier thus obtained, the above described optically active 1,1'-bianthryl-2,2' dicarboxylic acid is reacted in the presence of a condensation reagent for the preparation of a peptide, such as dicyclohexylcarbodiimide, N-ethoxycarbonyl-2-ethoxy-1,3-dihydroquinoline or 1-ethyl-3-(3-dimethylaminopropyl)-carbodiimide, to fix the dicarboxylic acid to the carrier by an amide bond. Otherwise, the dicarboxylic acid may be fixed by an ionic bond without adding such a condensation reagent. Of course, both bonds may be present.

Packing of the packing material of the present invention into a column can be conducted by a conventional method.

Now, the present invention will be described in further detail with reference to Examples. However, it should be understood that the present invention is by no means restricted to such specific Examples.

EXAMPLE 1

(1) Preparation of amino alkyl-grafted silica gel 50.24 g of silica gel (which was dried for about 6 hours at 150° C. under $1 \times 10^{-4}$ torr) was suspended in 300 ml of dried toluene. To the suspension, 100 g (0.45 mol) of 3-aminopropyl triethoxysilane was added, and the mixture was mildly refluxed under heating for 40 hours under nitrogen stream. The reaction suspension was cooled, and then the silica was collected by filtration with a glass filter of G4 and washed sequentially with toluene, methanol, acetone and ethyl ether, followed by drying to obtain an amino propyl group-grafted silica gel.

Amount: 59.66 g, Elemental analysis: C% 8.10; H% 2.07; N% 1.42.

Amount of amino groups introduced: 1.01 mmol/g (from the elemental analysis of nitrogen)

(2) Optical resolution of dl-1,1'-bianthryl-2,2'(2) dicarboxylic acid 2.6 g (5.65 mmol) of dl-1,1'-bianthryl-2,2'-dicarboxylic acid is suspended in 125 ml of ethanol and then dissolved under heating and refluxing. Then, 4.25 g (13.84 mmol) of quinidine was dissolved therein, and the solution was again refluxed under heating for 30 minutes and then cooled, whereupon precipitated crystals were collected by filtration. The crystals were recrystallized from 50 ml of ethanol to obtain 2.47 g of a quinidine salt of (R)-1,1-bianthryl-2,2'-dicarboxylic acid.

The salt was stirred in 2N HCl and then extracted with ethyl acetate to obtain 0.93 g (yield: 74.4%) of (R)-1,1'-bianthryl-2,2'-dicarboxylic acid.

The optical purity of the optically active substance thus obtained was found to be 100% by converting it to its methyl ester with diazomethane and analyzing the ester by a Pirkle type optical resolution column.

The filtrate was distilled under reduced pressure, and similar recrystallization was repeated, and the salt thereby obtained was subjected to hydrochloric acid treatment in the same manner to obtain (S)-isomer.

(3) Preparation of a carrier with an optically active stationary phase of (R)-1,1'-bianthryl-2,2'-dicarboxylic acid 3.00 g of the aminopropyl group-grafted silica prepared in Step (1) was suspended in a DHF solution containing 0.92 g (2.08 mmol) of (R)-1,1'-bianthryl-2,2'-dicarboxylic acid and 1.03 g (4.06 mmol) of N-ethoxycarbonyl-2-ethoxy-1,3-dihydroquinone, and an ultrasonic wave was irradiated to the suspension under a nitrogen stream for 8 hours. Then, the reaction suspension was subjected to filtration by means of a glass filter of G4, whereby the silica was collected by filtration in a constant temperature bath of 125° C. The silica was washed sequentially with THF, methanol, acetone and ethyl ether, followed by drying under reduced pressure to obtain 3.44 g of a packing material of the present invention.

APPLICATION EXAMPLE

The optically active packing material for liquid chromatography obtained in the above Example was packed into a column by a slurry method, and separation of racemic modification samples was conducted under the following conditions for measurement, whereupon the retention factor (K') and the separation factor (α) were determined. The results thereby obtained are shown in Table 1. Further, for the purpose of comparison, similar tests were conducted by using (S)-1,1'-binaphthyl-2,2' dicarboxylic acid as stationary phase, and the results thereby obtained are shown also in Table 1.

Conditions for measurements

Column: Stainless steel column of 4.6 mm in diameter and 25.0 cm in length
Detector: UV-8010 (manufactured Tosoh Corporation)
Pump: CCPD (manufactured Tosoh Corporation)
Temperature: 25° C.
Flow rate: 1.0 ml/min
Mobile phase: hexane-alcohol system (the proportions are indicated in Table 1)

TABLE 1

| (dl)-alcohol | | Stationary phase of the present invention | | | Comparative stationary phase i-PrOH | | |
|---|---|---|---|---|---|---|---|
| R1* | R2* | i-PrOH(R) | K1 | α | (R) | K1 | α |
| CH$_3$ | C$_2$H$_5$ | 20 | 4.26 | 1.13 | No ability for resolution | | |
| CH$_3$ | n-C$_3$H$_7$ | 20 | 3.86 | 1.20 | 10 | 5.78 | 1.08 |
| CH$_3$ | phe | 20(EtOH) | 3.93 | 2.31 | 15 | 3.86 | 1.54 |
| CH$_3$ | CH=CH$_2$ | 20 | 5.56 | 1.12 | 10 | 5.90 | 1.08 |

*R1—CH—R2
  |
  O—CONH—DNP (DNP = 3,5-dinitrophenyl)

As described in the foregoing, the stationary phase of the optically active compound of the present invention is very effective for the resolution of dl-alcohols, which used to be very difficult, and its preparation is simple. Thus, it makes an excellent packing material.

We claim:

1. A packing material for liquid chromatography comprising (S)-or(R)-1,1'-bianthryl-2,2'-dicarboxylic acid as a stationary phase on a substrate carrier.

2. The packing material according to claim 1, wherein the dicarboxylic acid is fixed on a porous carrier.

3. The packing material according to claim 2, wherein the porous carrier is silica gel, glass beads or diatomaceous earth.

4. The packing material according to claim 2, wherein the porous carrier is spherical particles having a particle size of from 0.1 to 1000 μm and a pore size of from 10 to 1000 Å.

5. The packing material according to claim 2, wherein the porous carrier is spherical particles having a particle size of from 1 to 100 μm and a pore size of from 50 to 500 Å.

6. The packing material according to claim 2, wherein the dicarboxylic acid is fixed to the carrier by an amide bond or an ionic bond.

* * * * *